United States Patent [19]
Yamasaki

[11] Patent Number: 5,477,353
[45] Date of Patent: Dec. 19, 1995

[54] PHOTOGRAPHIC IMAGE PROCESSING SYSTEM HAVING LABORATORY UNIT FOR PROCESSING FILM AND PHOTOGRAPHER UNIT FOR SUPPLYING PRINTING INFORMATION

[75] Inventor: Masafumi Yamasaki, Tokyo, Japan

[73] Assignee: Olympus Optical Co., Ltd., Tokyo, Japan

[21] Appl. No.: 228,441

[22] Filed: Apr. 15, 1994

[30] Foreign Application Priority Data

Apr. 21, 1993 [JP] Japan .................................. 5-094224
Apr. 26, 1993 [JP] Japan .................................. 5-099335

[51] Int. Cl.$^6$ ................................................. H04N 1/00
[52] U.S. Cl. ........................................... 358/487; 358/527
[58] Field of Search ................................. 358/400, 401, 358/500, 504, 527, 537, 452, 487; 355/38; H04N 1/00, 1/46

[56] References Cited

U.S. PATENT DOCUMENTS

| | | | |
|---|---|---|---|
| 5,168,303 | 12/1992 | Ikenoue et al. . | |
| 5,189,511 | 2/1993 | Parulski et al. | 358/518 |
| 5,208,911 | 5/1993 | Newman et al. | 358/518 |
| 5,258,859 | 11/1993 | Wada et al. | 358/400 |
| 5,272,549 | 12/1993 | McDonald | 358/527 |
| 5,276,511 | 1/1994 | Takemoto | 358/500 |
| 5,296,945 | 3/1994 | Nishikawa et al. | 358/518 |

FOREIGN PATENT DOCUMENTS 3-153228 7/1991 Japan .
3-153229 7/1991 Japan .

OTHER PUBLICATIONS

Kodak Image–link Digital Workstation, Information Media & Technology, vol. 23, No. 6, Broadhurst, R. N.

Primary Examiner—Scott A. Rogers
Assistant Examiner—Kim Yen Vu
Attorney, Agent, or Firm—Frishauf, Holtz, Goodman, Langer & Chick

[57] ABSTRACT

In a first system, a laboratory unit includes a developing machine for developing an exposed film, a printer for printing the exposed film, a print identification code printer, a film identification code reader for reading a film identification code, a scanner for reading the image recorded on the exposed film, a controller for controlling an image memory in is stored the image data sent from the photographer, and a printer which prints the image data. Also in the first system, a photographer unit includes an image memory for storing image data sent from the laboratory side, an image processing unit, an operation member, a monitor, an optical disc unit, and an image memory. The laboratory unit is connected to the photographer unit by a transmission line containing terminal repeaters. In a second system, on the photographer side, the images on a negative film are read by a scanner and converted into digital image data. The digital image data is processed by an image processing unit. The digital image data processed by the image processing unit is transferred to the laboratory side via terminal repeaters. The transferred data contains the digital image data, the data used to identify the sender, and at least one of data indicating the print size and data indicating the number of prints. A printer effects printing on the basis of the image data transferred.

7 Claims, 7 Drawing Sheets

| SENDER'S CODE | RECEIVER'S CODE | FILM NO. | IMAGE DATA |
|---|---|---|---|
| | | | |
F I G. 4A
| SENDER'S CODE | RECEIVER'S CODE | PRINT SIZE | NUMBER OF PRINTS | IMAGE DATA |
|---|---|---|---|---|
| | | | | |
F I G. 4B
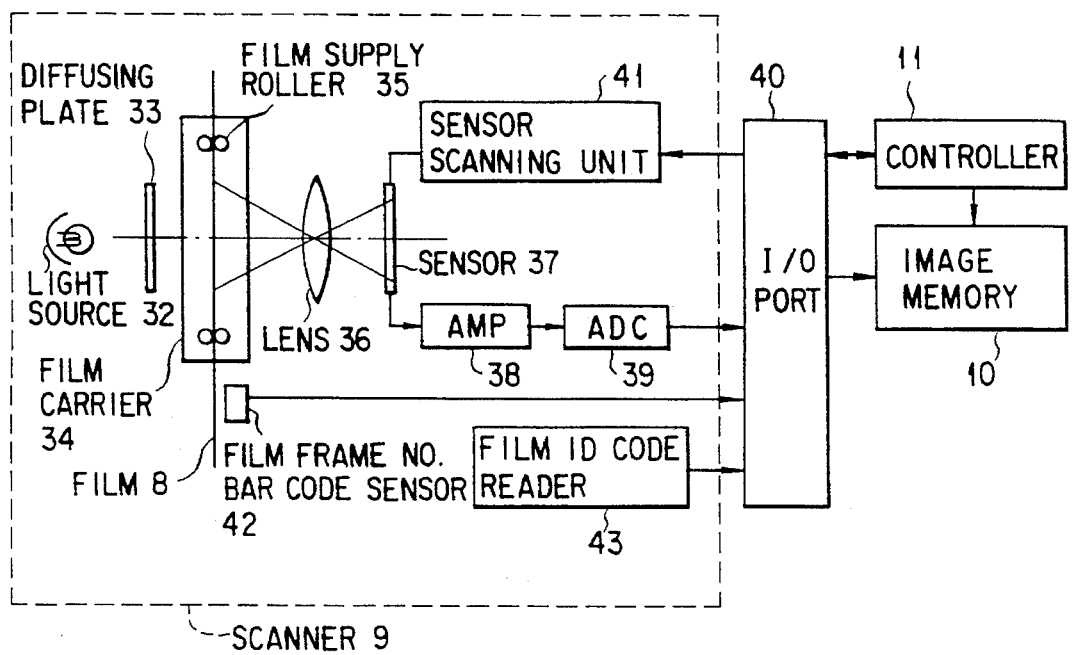
F I G. 5

PHOTOGRAPHIC IMAGE PROCESSING SYSTEM HAVING LABORATORY UNIT FOR PROCESSING FILM AND PHOTOGRAPHER UNIT FOR SUPPLYING PRINTING INFORMATION

BACKGROUND OF THE INVENTION

1. Field of the invention

The present invention relates to a photographic image processing system which reads the images on an exposed film with a scanner, performs various processes including trimming and composition, and then prints the images, and more particularly to a photographic image processing system which facilitates the producing of photographs so trimmed, composed and density-adjusted as the photographer desires.

2. Description of the Related Art

Various techniques have been proposed which read the images with a scanner from a negative film on which photography is finished in the laboratory, convert them into digital image data, then subject the data to image processes including trimming, composition, density adjustment, etc. according to the photographer's intentions, and thereafter print photographs.

For example, in a technique relating to "a trimming photographic printer" disclosed in Japanese Pat. Appln. KOKAI Publication No. 3-153228, the trimming information recorded on a recording medium such as a photographic film is read, and according to the trimming information, the printing system is set in a trimming printing state. At this time, the trimming state is displayed on a monitor, and it is judged whether the trimming is acceptable or not.

In the printing method disclosed in Japanese Pat. Appln. KOKAI Publication No. 3-153229, the quality of subject-illuminating light is estimated from information on the date and time at which the picture was taken, the amount of light, and whether or not a strobe was used, and on the basis of the estimated light quality, the printing exposure is determined, followed by the printing of the film image on photographic paper.

With the trimming photographic printer disclosed in Japanese Pat. Appln. KOKAI Publication No. 3-153228, however, it is very tedious to write trimming information at the time of photography. Furthermore, since this method requires a large system, it is impossible to make the camera more compact and lighter.

In the printing method disclosed in Japanese Pat. Appln. KOKAI Publication No. 3-153229, the recording unit is large and the parameters used to determine the quality of light are complex, which does not necessarily assure high estimation accuracy. Even if the light quality is estimated accurately, the method cannot keep up with the individual's liking that differs subtly from person to person.

SUMMARY OF THE INVENTION

It is, therefore, an object of the present invention to provide a new and improved photographic image processing system which makes it possible to produce high-quality prints with the trimming, composition, density adjustment, etc. conforming with the photographer.

According to an aspect of the present invention, there is provided a photographic image processing system comprising: a laboratory unit for processing an exposed film; and a photographer unit for processing images recorded on the exposed film; the laboratory unit comprising: an identification code reader for reading an identification code of the exposed film; a scanner for converting the image recorded on the exposed film into digital image data; a first image memory for storing the digital image data converted by the scanner corresponding to the identification code; and first transmission means for transmitting the digital image data stored in the first image memory via a transmission line; and the photographer unit comprising: reception means for receiving the digital image data transmitted by the first transmission means; a second image memory for storing the digital image data received by the reception means; image processing means for processing the digital image data stored in the second image memory; and second transmission means for transmitting the digital image data processed by the image processing means to the laboratory unit, wherein the laboratory unit further comprises printing means for printing the digital image data transmitted by the second transmission means.

According to another aspect of the present invention, there is provided a photographic image processing system comprising: a centralized processing center for processing exposed films; and a terminal unit for processing the images on the exposed films; the centralized processing center comprising: a scanner for converting the images On the exposed film into an image signal; storage means for storing the image signal converted by the scanner; and first transmission means for transmitting the image signal stored in the storage means; and the terminal unit comprising: image processing means for receiving and processing the image signal transmitted from the first transmission means; and second transmission means for transmitting the image signal processed by the image processing means to the centralized processing center, wherein the laboratory unit further comprises a printer for effecting printing on the basis of the image signal transmitted by the second transmission means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4A shows the data structure sent from the laboratory unit 16 to the photographer unit 23;

FIG. 4B shows the data structure sent from the photographer unit 23 to the laboratory unit 16;

FIG. 5 is a detailed block diagram of the scanner 9 of FIG. 1;

DETAILED DESCRIPTION OF THE PREFERRED EMBODIMENTS

Figure 1:
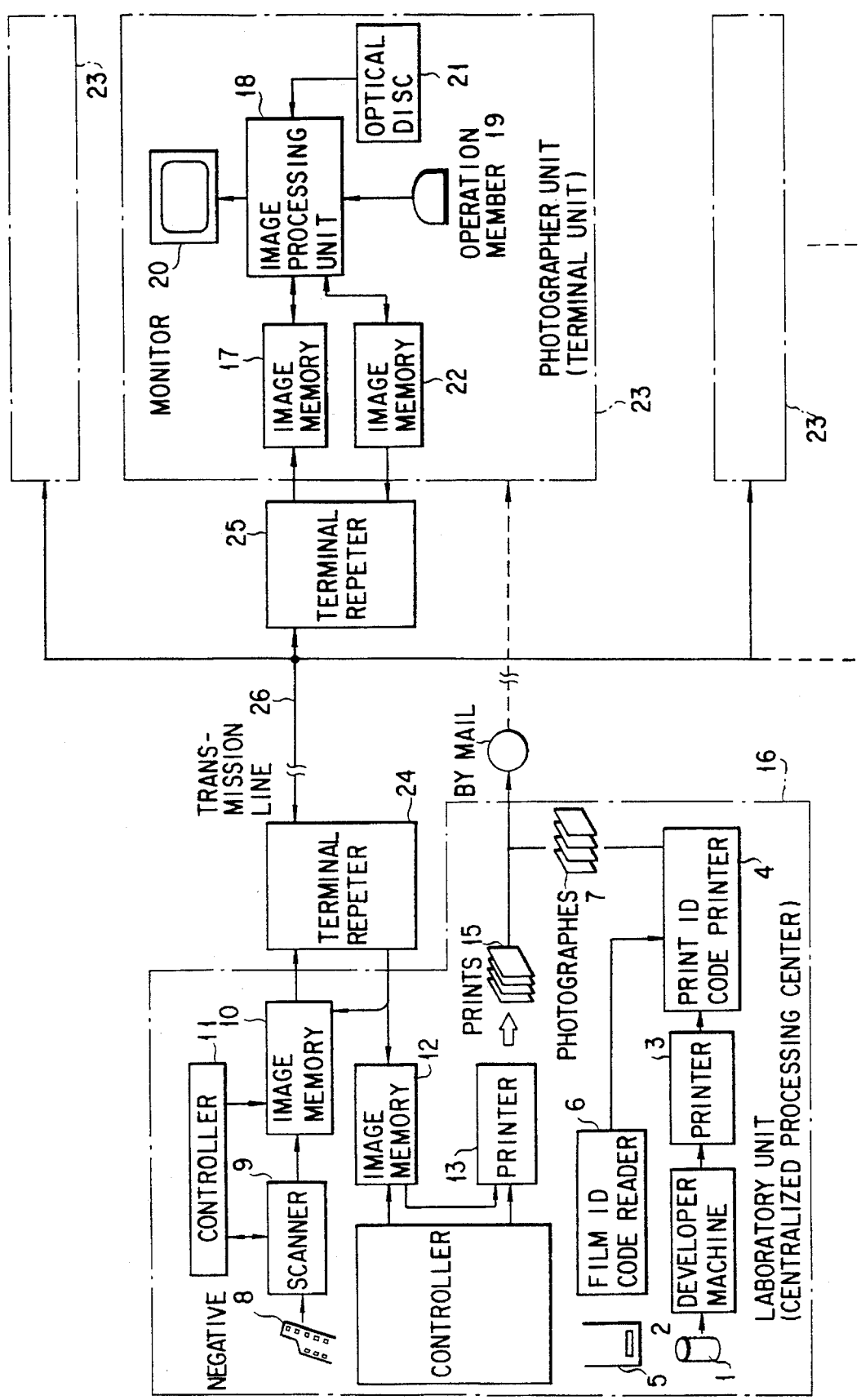
FIG. 1 is a schematic block diagram of an entire photographic image processing system according to a first embodiment of the present invention.

Reference will now be made in detail to the presently preferred embodiments of the invention as illustrated in the accompanying drawings, in which like reference characters designate like or corresponding parts throughout the several drawings.

A photographic image processing system according to a first embodiment of the present invention is outlined as follows. This system produces photographs as the photographer wants without costing him much by connecting, by means of transmission lines such as optical fibers, a laboratory side provided with a developer machine, a printer, and a scanner to a photographer side provided with an image processing unit that performs image processes including trimming and composition. First, when the photographer hands his IC card and exposed film to the laboratory, a code used to identify the film is registered. The prints obtained are marked with a code corresponding to the film's identification code. At the same time, in the laboratory, the data on the film is read with a scanner and converted into digital image data, which is then stored in a memory in a manner that corresponds to the film's identification code. On the other hand, the photographer selects particular ones from the prints he received in order to effect trimming, composition, etc. Then, photographer selects the image data corresponding to the prints from the image memory in the laboratory via the transmission line and receives the selected data via the transmission line. The received image data undergoes trimming and other image processing including combining with other images. The processed image data is transmitted over the transmission line to the laboratory again, where the data is printed by a printer. The prints are sent to the photographer.

Hereinafter, referring to the accompanying drawings, the first embodiment will be described in detail.

FIG. 1 shows the configuration of an entire photographic image processing system according to the first embodiment. In FIG. 1, reference numeral 1 indicates an exposed film 1. The exposed film 1 is developed with a developer machine 2, printed on photographic paper by a printer 3, and thereafter sent to a print identification printer 4. The film identification code recorded on a film storage bag 5 is read by a film identification code reader 6. Reference numeral 7 indicates printed photographs.

In FIG. 1, reference numeral 8 is a developed film. The image data on the developed film 8 is read by a scanner 9 and converted into digital image data. The digital image data is stored in an image memory 10. The image memory 10 and scanner 9 are controlled by a controller 11.

In FIG. 1, reference numeral 12 indicates an image memory for storing the processed digital image data transmitted from the photographer side (explained later). The image data in the image memory 12 is printed by a printer 13. The timing between the image memory 12 and the printer 13 is controlled by a controller 14. Reference numeral 15 indicates prints printed by the printer 13.

The individual components described above are the basic components contained in a laboratory unit (centralized processing center) 16.

Next, the basic arrangement of a photographer unit or units (terminal unit or units) 23 will be explained.

In FIG. 1, reference numeral 17 indicates an image memory for storing the image data supplied from the laboratory unit 16 at the request of the photographer. The image data stored in the image memory 17 is supplied to an image processing unit 18 and undergoes image processing with an operation member (a mouse and a keyboard) 19. The processed data is displayed on a monitor 20. Reference numeral 21 indicates an optical disc in which the image data for combining images and numeral 22 indicates an image memory for storing the image data processed at the image processing unit 18.

In FIG. 1, reference numerals 24 and 25 are terminal repeaters for a transmission line 26.

Before explaining the operation of the image processing system in. FIG. 1, the film identification code reader 6 will be described with reverence to FIGS. 2A and 2B.

Figures 2A, 2B:
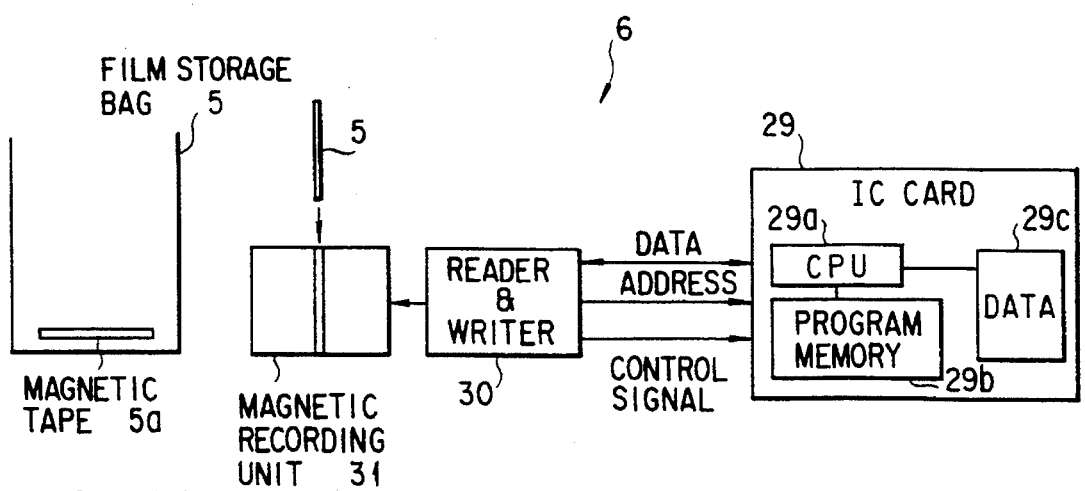
FIG. 2A shows a film storage bag of FIG. 1.
FIG. 2B is a block diagram of the film identification code reader of FIG. 1.

As shown in, FIG. 2A, a magnetic tape 5a is stuck on the film storage bag 5. The photographer has an IC card 29, which contains a CPU 29a, a program memory 29b, a data storage section 29c, etc. as shown in FIG. 2B. The IC card 29 stores the photographer's ID code and the serial code data item unique to each roll of film whose development is asked of the laboratory.

The ID code and serial code are recorded as a film identification code onto the magnetic tape 5a on the film storage bag 5 by a magnetic recording unit 31 via a reader and writer 30. At the same time, the reader and writer 30 increments the serial code on the IC card 29.

In this way, new film identification codes are always allocated to films one after another.

Next, the operation of the image processing system of FIG. 1 will be explained.

Figure 3A:
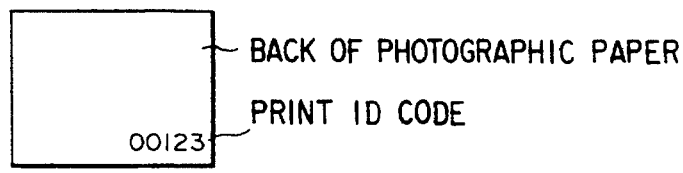
FIG. 3A is a view of a print identification code.
Figure 3B:
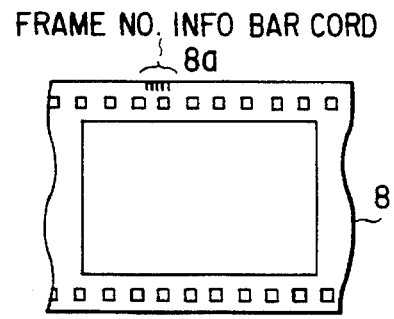
FIG. 3B is a view of a frame number information bar code marked on the film.

First, the film identification code previously recorded on the magnetic tape 5a stuck to the film storage bag 5 is read by the reader 6. On the other hand, the exposed film 1 is developed by the developer machine 2 and then printed photographs 7 are produced by the printer 3. The print identification code as shown in FIG. 3A is printed On the back of the printed photographs 7 by the print identification code printer 4. The print identification code is recorded on the developed film 8 in the form of a combination of readout frame numbers consisting of the film identification code and the bar codes 8a recorded on the developed film 8 as shown in FIG. 3B explained later. The completed prints 7 are delivered to the photographer side by mail or in person.

The images on the developed film 8 are converted by the scanner 9 into digital image data, which is then stored in the image memory 10.

Figure 3C:
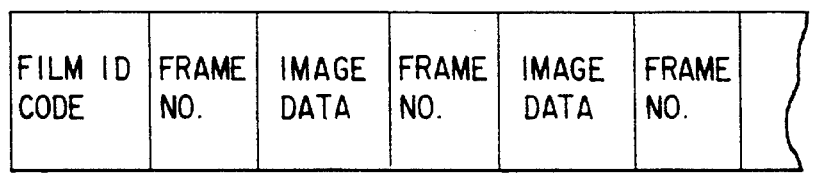
FIG. 3C shows the structure of image data.

FIG. 3C shows the image data structure. In FIG. 3C, the film identification code at the beginning of the structure is a composite code consisting of the photographer's ID code and a serial code corresponding to each roll of film. The frame number is a code corresponding to each frame of the film. This is recorded by sensing the frame number information bar code as shown in FIG. 3B. The image data corresponds to each frame.

After having received the prints 7 from the laboratory (laboratory unit 16), the photographer side selects prints 7 to be combined or trimmed and asks the laboratory over the phone to;send the image data corresponding to the print identification code marked on the back of the prints 7. The laboratory side then causes the controller 11 to select the image data corresponding to the reported print identification code from the image memory 10, and thereafter transmits and supplies the selected data to the image memory 17 of the photographer unit 23 possessed by the photographer via the terminal repeater 24, transmission line 16, and terminal repeater 25.

FIGS. 4A and 4B show the data structure to be transmitted. FIG. 4A shows the data structure to be sent from the laboratory unit 16 to the photographer unit 23. Using the image processing unit 18, the photographer acquiring the desired image data through the above-described transmission carries out composition, trimming, color balancing, and density adjustment. Thereafter, the processed image data is stored in the image memory 22, and at the same time, is sent to the laboratory unit 16 via the terminal repeater 25, transmission line 26, and terminal repeater 24 and stored in the image memory 12.

FIG. 4B shows the structure of the image data sent from the photographer unit 23 to the laboratory unit 16. The image data in the image memory 12 undergoes a printing process at the printer 13. The prints 15 thus produced are delivered to the photographer by post or in person.

FIG. 5 shows a detailed structure of the scanner 9 of FIG. 1.

In FIG. 5, white light from a light source 32 is directed to a one-dimensional color line sensor 37 via a diffusing plate 33, film 8 fed by a film supply roller 35 in a film carrier 34, and a lens 36. The image on the film 8 is focused by the lens 36 on the one-dimensional color line sensor 37. The output signal of the one-dimensional color line sensor 37 is converted into digital data by an A/D converter 39 via an amplifier circuit 38. The digital data is stored in the image memory 10 via an I/O port 40 and the controller 11. The controller 11 controls the flow of image data between the image memory 11 and the I/O port 40.

A film frame number bar-code sensor 42 provided near the film carrier 34 senses the frame number information bar code on the film 8 as shown in FIG. 3B. The data of the frame number information bar code sensed there is supplied to the controller 11 via the I/O port 40. A film identification code reader 43 reads the film identification code. These film identification code, frame number, and image data are stored in the image memory 10 by the controller 11 using the data structure as shown in FIG. 3C.

Figure 6:
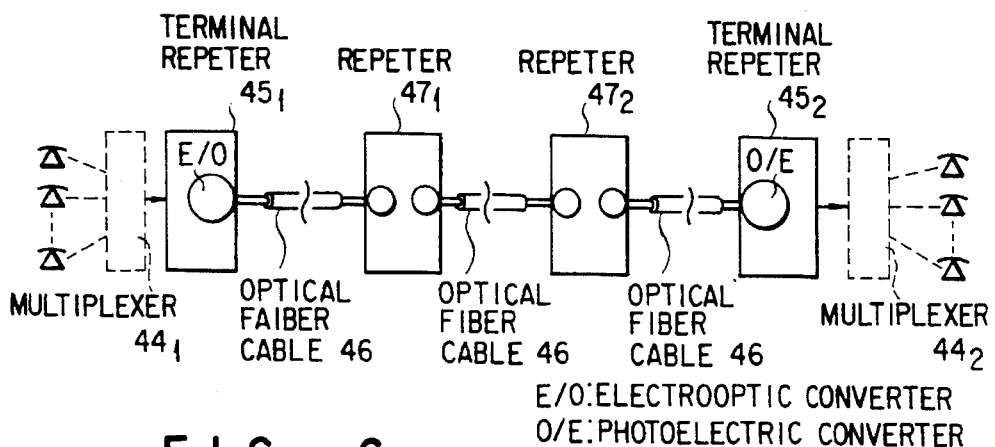
FIG. 6 is a block diagram of a communication system.

FIG. 6 shows the structure of a communication system. The data outputted from a multiplexer $44_1$ is supplied from a terminal repeater $45_2$ to a multiplexer $44_2$ via an optical fiber cable 46, repeaters $47_1$ and $47_2$, etc.

Figure 7A:
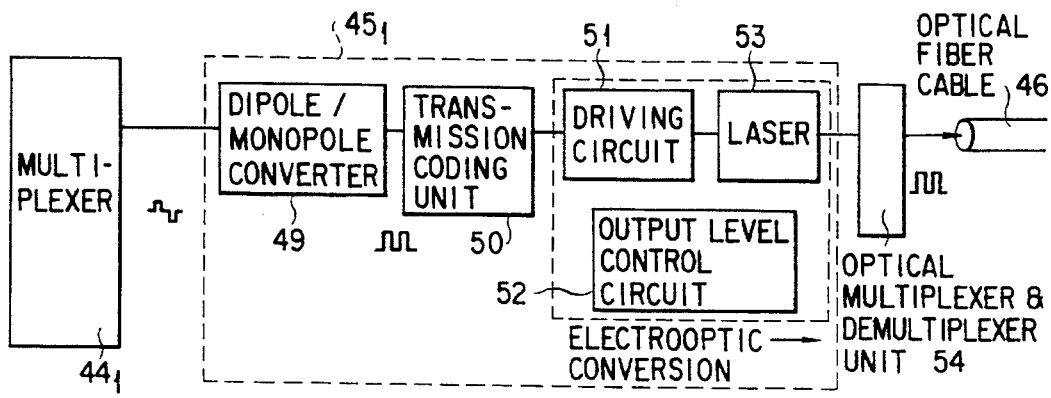
FIGS. 7A and 7B are block diagrams of the terminal repeaters $45_1$ and $45_2$ on the transmission and the reception side, respectively.
Figure 7B:
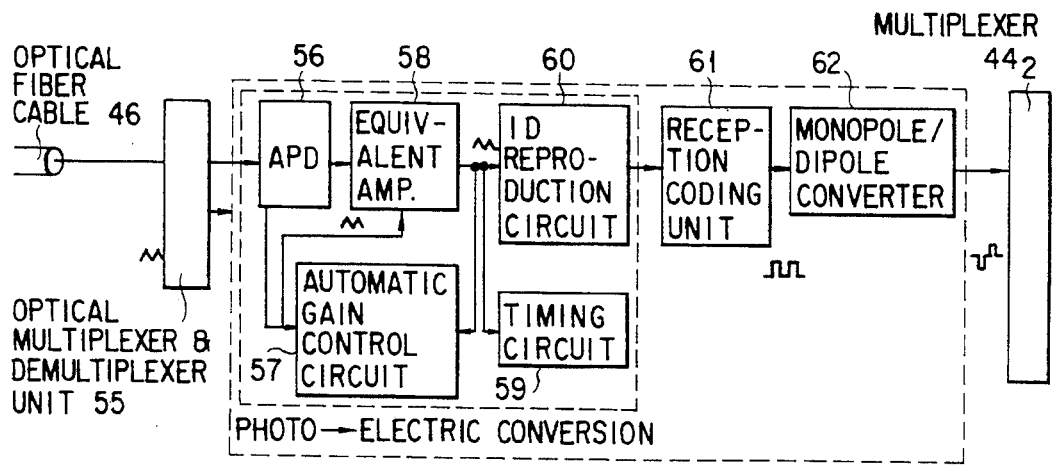

FIGS. 7A and 7B are block diagrams of the terminal repeaters $45_1$ and $45_2$ on the transmission and the reception side in the communication system of FIG. 6.

In FIG. 7A, the digital signal outputted from the multiplexer $44_1$ is converted by a dipole/monopole converter 49 and a transmission coding unit 50 into transmission code suitable for optical communication. An LD (laser diode) 53 is driven by a driving circuit 51 and an output level control circuit 52. The optical signal from the LD 53 passes through an optical multiplexer and demultiplexer 54, travels over an optical fiber cable 46, and enters the repeater $47_1$.

On the other hand, the terminal repeater $45_2$ is constructed as shown in FIG. 7B. Specifically, the optical signal supplied via the optical fiber cable 46 and an optical multiplexer and demultiplexer 55 is converted into an electric signal by an APD (Avalanche Photo Diode) 56. The converted digital signal passes through an automatic gain control circuit 57, an equivalent amplifier circuit 58, a timing circuit 59, and an identification reproduction circuit 60, and enters a reception coding unit 61, which converts the signal into a reception signal. The reception signal is further converted by a monopole/dipole converter 62 into the original signal, which is supplied to the multiplexer $44_2$.

In the repeaters $47_1$ and $47_2$, APDs convert an optical signal into an electric signal. The converted digital signal undergoes a regenerative repeating process as with an ordinary digital transmission repeater, which thereby drives an LD to supply the signal as an optical signal to the optical fiber cable 46.

While in the above-mentioned embodiment, the image data on the film on the laboratory side is stored in the image memory as digital image data, the aforesaid film identification code and films may be arranged suitably so that the correspondence of the image data to the prints delivered to the photographer side may be understandable. In this case, only after an image data transmission request has been received from the photographer side, the desired film frame is read by the scanner.

As described above, with the first embodiment of the invention, because the photographer himself carries out composition, trimming, color balance adjustment, and density adjustment using a simple image processing unit, and sends the image data via the digital communication line to the laboratory for printing, it is possible to obtain prints as the photographer wants. Since the photographer himself does not have to have expensive systems including a scanner and a printer, he can get the desired photographs at low cost.

A photographic image processing system according to a second embodiment of the present invention is outlined as follows. In this system, when a scanner means reads the images on the film and converts them into digital image data, an image processing means processes the digital image data from the scanner means. A transmission means then transmits the image data subjected to the image process at the image processing means, and a printing means processes prints on the basis of the image data transmitted from the transmission means. The transmission data contains the image data, data used for identifying the sender, and at least either data indicating the print size or data indicting the number of prints.

Hereinafter, referring to the accompanying drawings, the second embodiment will be explained.

Figure 8:
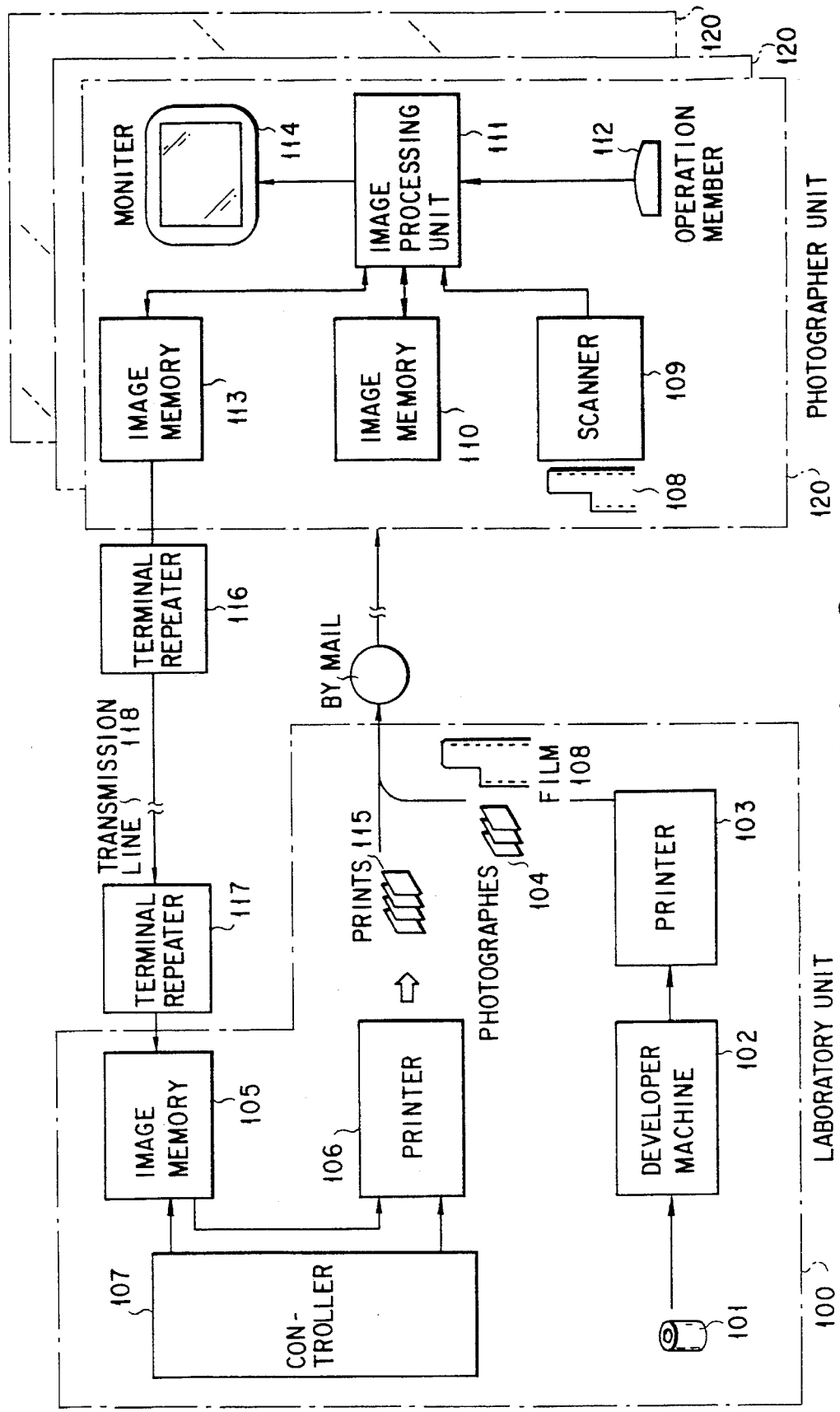
FIG. 8 is a schematic block diagram of a photographic image processing system according to a second embodiment of the present invention.

FIG. 8 is a schematic block diagram of a photographic image processing system according to the second embodiment.

As shown in FIG. 8, the photographic image processing system of the second embodiment comprises a laboratory unit (centralized processing center) 100, and a photographer unit or units (terminal units) 120. The units 100 and 120 are connected to each other by means of terminal repeaters 116 and 117 and a transmission line 118.

The laboratory unit 100 comprises a developer machine 102 for developing an exposed film 101, a printer 103 for producing prints 104 from the film 101 developed by the developer machine 102, an image memory 105 for storing the image data subjected an image process transmitted from the photographer unit 120 via the transmission line 118 and terminal repeaters 116 and 117, a printer 106 for printing photographs on the basis of the image data in the image memory 105, and a controller 107 for controlling the exchange of image data between the image memory 105 and the printer 106.

On the other hand, the photographer unit 120 comprises a scanner 109 for reading the images on a negative film 108 delivered to the photographer side, for example, by mail, and converting them into digital image data, an image memory 110 for storing the digital image data, an image processing unit 111 for effecting image processes including composition and trimming on the basis of the image data, an operation member 112 for operating the image processing unit 111, a monitor unit 114 for displaying images, and an image memory 113 for storing the image data subjected to the image processing.

With this arrangement, in the laboratory unit 100, the exposed film 101 is developed with the developer machine 102 and then printed with the printer 103. The printed photographs 104, together with the negative film 108, are delivered to the photographer side by mail, for example.

Then, in the photographer unit 120, after having received the negative film 108, the scanner 109 reads the images on the negative film 108 to convert them into digital image data. The digital image data is stored in the image memory 110 via the image processing unit 111. While the images related to the image data stored in the image memory 110 are being monitored on the monitor unit 114, desired processes including combining with other image data sets, trimming, and density adjustment are performed by the image processing unit 111 by operating the operation member 112. The image data subjected to the image processing is transmitted to the laboratory unit 100 via the terminal repeater 116, transmission line 118, and terminal repeater 117, and is stored in the image memory 105.

Furthermore, in the laboratory unit 100, the image data in the image memory 105 is sent to the printer 106 under the control of the controller 107. The printer 106 produces as many prints as and of the size specified by the photographer. The prints thus produced are delivered to the photographer by mail or in person.

Figures 9, 10:
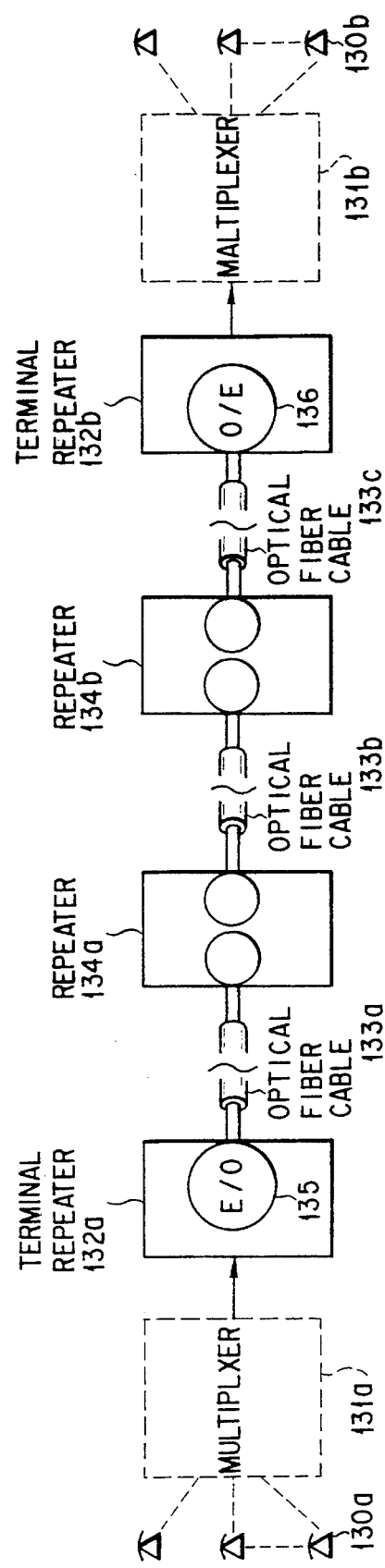
FIG. 9 shows the structure of image data to be transmitted.
FIG. 10 is a block diagram of a general transmission system.

The structure of the transmission data is shown in FIG. 9. Specifically, at the beginning of the data, the sender's code 220 for a printing process of the image data subjected to the image processing is placed. This code is registered previously with the laboratory and the client. The next data item 221 indicates the size of photographic paper, and data item 222 is a data item indicating the number of prints. Data item 223 is the image data subjected the image processing. These data items 220 to 223 form a set of data, which is sent from the photographer unit 120 to the laboratory unit 100. In FIG. 8, a set of data shown in FIG. 9 is called image data.

FIG. 10 shows the configuration of an ordinary transmission system.

In FIG. 10, a plurality of input signals supplied from various input terminal units 130a are converted by a multiplexer 131a into multiplex signals, which are then inputted to a terminal repeater 132a in the transmission system. The electric signal is converted by an electrooptic (E/O) converter 135 of the terminal repeater 132a into an optical signal, which is inputted to a repeater 134a via an optical fiber cable 133a. Furthermore, when the optical signal is inputted to a terminal repeater 132b in the reception system via an optical fiber cable 133b and a repeater 134b, an optical/electrical (O/E) converter 136 of the terminal repeater 132b converts the optical signal into an electric signal, which is then inputted to a multiplexer 131b. The single signal transmitted over the optical fiber cable is distributed to the terminal units 130b.

Figure 11A:
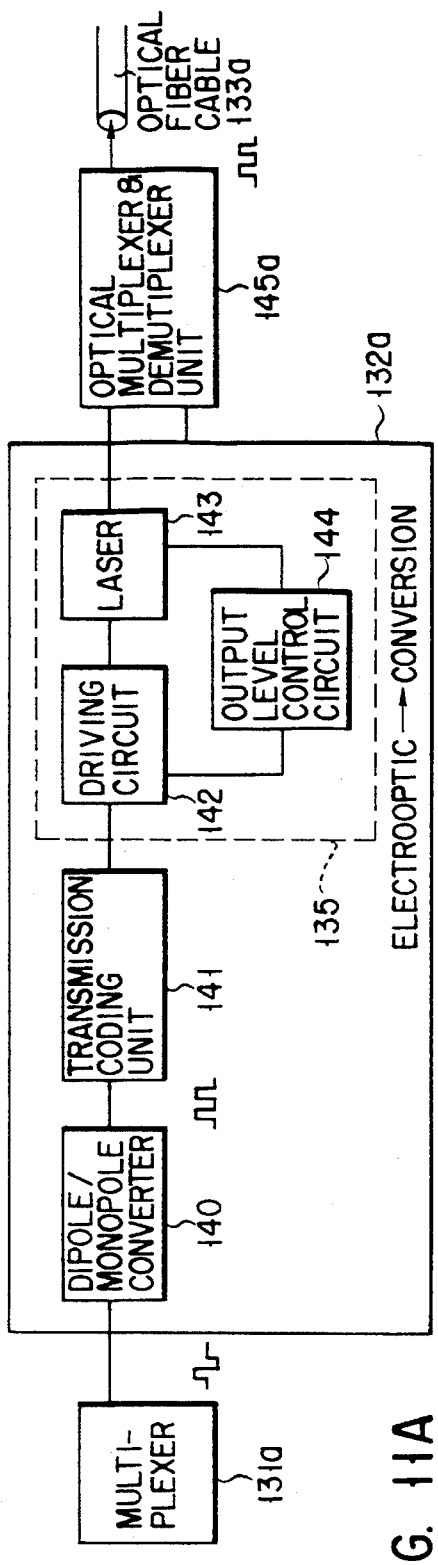
FIGS. 11A and 11B are detailed block diagrams of the terminal repeater units 132a and 132b of FIG. 10.
Figure 11B:
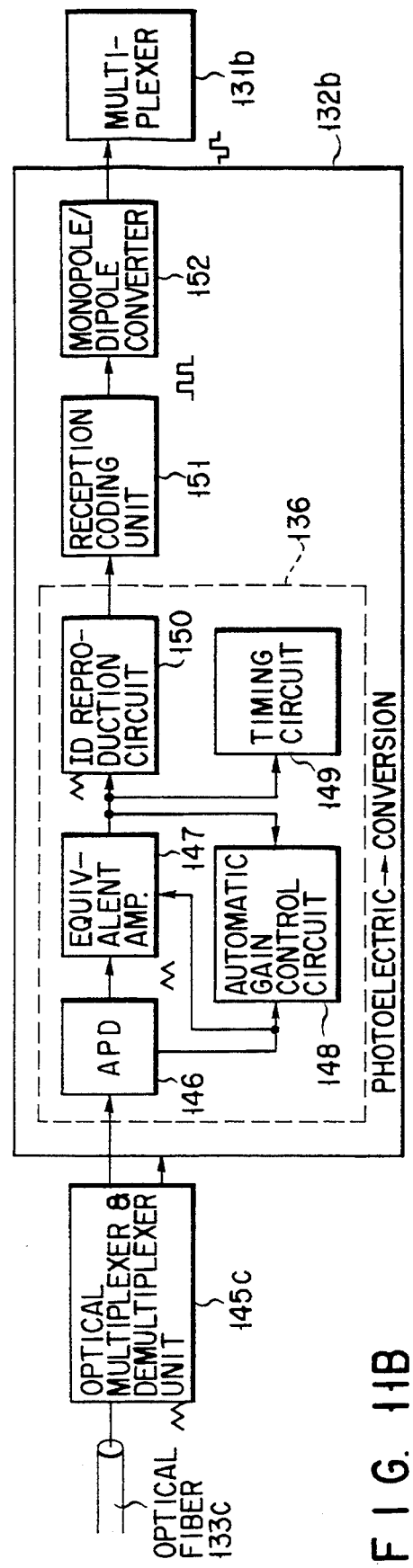

FIGS. 11A and 11b are detailed block diagrams of the terminal repeaters 132a and 132b in the transmission system, respectively.

First, as shown in FIG. 11A, when the bipolar digital signal from the multiplexer 131a is inputted to the terminal repeater 132a, the digital signal is converted into a monopole signal by a dipole/monopole converter 140. After the unipolar signal is subjected to a coding process at a transmission coding unit 141, the resulting signal is inputted to the E/O converter 135. The signal is then converted by a driving circuit 142 and an output level control circuit 144 into a transmission code suited for optical communication. The converted signal is used to drive a laser diode (LD) 143. The optical signal from the LD 143 is propagated over the optical fiber cable 133a via an optical multiplexer/demultiplexer 145a.

Then, as shown in FIG. 11B, when the optical signal from the LD 143 travels over an optical fiber cable 133c, passes through an optical multiplexer/demultiplexer 145c, and enters the terminal repeater 132b, the optical signal is converted into an electric signal by an avalanche photodiode (ADP) 146 of the O/E converter 136. Then, the converted digital signal is converted by a reception coding circuit 151 and a monopole/dipole converter 152 into a bipolar digital signal, which is then sent to the multiplex converter 131b.

As described in detail, with the photographic image processing system of the second embodiment, a relatively inexpensive scanner and a multipurpose personal computer are combined into an image processing system. This enables the photographer to achieve not only the editing of images including trimming and composition at home or at his workshop, but also a picture quality-improving process such as color balance adjustment, thereby making it possible to produce photographs as he wants. Additionally, with the system of the second embodiment, because the printing system in the laboratory can be shared for a printing process by transmitting the image data via the transmission line, high picture-quality prints can be obtained at low cost.

Accordingly, with the present invention, it is possible to provide an image processing system which inexpensively produces high picture-quality prints subjected to trimming, composition, density adjustment, etc, as the photographer desires.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A photographic image processing system comprising:
   a laboratory unit for processing an exposed film; and
   a photographer unit for processing images recorded on said exposed film;
   said laboratory unit comprising:
   an identification code reader for reading an identification code of said exposed film;

a scanner for converting the images recorded on said exposed film into digital image data;

a first image memory for storing said digital image data read by said scanner corresponding to said identification code; and first transmission means for transmitting said digital image data stored in said first image memory via a transmission line; and said photographer unit comprising:

reception means for receiving said digital image data transmitted by said first transmission means;

a second image memory for storing said digital image data received by, said reception means;

image processing means for processing said digital image data stored in said second image memory; and second transmission means for transmitting said digital image data processed by said image processing means to said laboratory unit, wherein said laboratory unit further comprises printing means for printing said digital image data transmitted by said second transmission means.

2. A photographic image processing system according to claim 1, wherein said printing means of said laboratory unit comprises:

a printer for printing said exposed films, thereby to obtain photographs; and a code printer for printing said identification code on the photographs printed by said printer.

3. A photographic image processing system according to claim 1, wherein:

said first image memory stores said images according to film frame information, in addition to said film identification code; and said first transmission means determines an image on the basis of said film identification code and said film frame information, and transmits information on the determined image.

4. A photographic image processing system according to claim 1, wherein said image processing means in said photographer unit comprises an operation member, and processes images by operating the operation member.

5. A photographic image processing system, comprising:

a centralized processing Center for processing an exposed film; and a terminal unit for processing images recorded on said exposed film;

said centralized processing center comprising:

a scanner for converting the images recorded on said exposed film into an image signal;

storage means for storing said image signal converted by said scanner; and first transmission means for transmitting said image signal stored in said storage means to said terminal via a communication line coupled between the centralized processing center and said terminal unit; and said terminal unit comprising:

image processing means for receiving and processing said image signal transmitted by said first transmission means; and second transmission means for transmitting the image signal processed by said image processing means to said centralized processing center via the communication line, wherein said centralized processing center further comprises a printer for effecting printing of a photographic image on the basis of said image signal transmitted by said second transmission means via the communication line.

6. A photographic image processing system according to claim 5, wherein said communication line coupled between said centralized processing center and said terminal unit comprises an optical communication network.

7. A photographic image processing system according to claim 5, comprising at least two of said terminal units connected to said centralized processing center via respective communication lines.

* * * * *

UNITED STATES PATENT AND TRADEMARK OFFICE
CERTIFICATE OF CORRECTION

PATENT NO. : 5,477,353
DATED : December 19, 1995
INVENTOR(S) : Yamasaki

It is certified that error appears in the above-indentified patent and that said Letters Patent is hereby corrected as shown below:

Title page, Item [57] ABSTRACT, line 7, before "is stored", insert, --which--;

line 7, delete "the" (first occurrence).

Signed and Sealed this

Twenty-fifth Day of June, 1996

Attest:

BRUCE LEHMAN

Attesting Officer   Commissioner of Patents and Trademarks